(12) United States Patent
Clabunde

(10) Patent No.: US 8,776,652 B2
(45) Date of Patent: Jul. 15, 2014

(54) DEVICE AND METHOD FOR CUTTING THROUGH THE ADHESIVE BEAD OF PANES

(75) Inventor: Joachim Clabunde, Heubach (DE)

(73) Assignee: C. & E. Fein GmbH (DE)

( * ) Notice: Subject to any disclaimer, the term of this patent is extended or adjusted under 35 U.S.C. 154(b) by 244 days.

(21) Appl. No.: 13/412,291

(22) Filed: Mar. 5, 2012

(65) Prior Publication Data

US 2012/0227896 A1 Sep. 13, 2012

(30) Foreign Application Priority Data

Mar. 7, 2011 (DE) .......................... 10 2011 013 890

(51) Int. Cl.
  *B26B 27/00* (2006.01)
  *B60J 10/00* (2006.01)
  *B26D 1/547* (2006.01)
  *B26D 5/42* (2006.01)

(52) U.S. Cl.
  USPC .................................... 83/76; 83/574; 30/116

(58) Field of Classification Search
  USPC ............ 83/72, 76, 374, 542, 574, 651.1, 651;
                                    254/278; 30/116; 156/344
  See application file for complete search history.

(56) References Cited

U.S. PATENT DOCUMENTS

| 4,215,475 A * | 8/1980 | Morford et al. .............. 30/272.1 |
| 4,227,517 A * | 10/1980 | Aguiar .............................. 602/9 |
| 4,417,398 A * | 11/1983 | Steck .............................. 30/116 |
| 4,995,153 A * | 2/1991 | Asbery ............................ 30/116 |
| 5,481,482 A * | 1/1996 | Nagai et al. ................... 700/301 |
| 5,551,525 A * | 9/1996 | Pack et al. ....................... 180/8.6 |
| 5,622,093 A * | 4/1997 | Hutchins ........................... 83/13 |
| 5,752,420 A * | 5/1998 | Connors ........................... 83/54 |
| 6,591,502 B1 * | 7/2003 | Gmeilbauer .................... 30/116 |
| 6,616,800 B2 * | 9/2003 | Eriksson ........................ 156/714 |
| 6,979,032 B2 * | 12/2005 | Damhuis .......................... 294/65 |
| 7,044,330 B2 * | 5/2006 | Chirnomas ..................... 221/123 |
| 7,618,023 B2 * | 11/2009 | Ericson ........................... 254/278 |
| 8,099,869 B2 * | 1/2012 | Hess ................................. 30/116 |
| 8,474,355 B2 * | 7/2013 | Finck ................................. 83/39 |
| 2002/0036108 A1 * | 3/2002 | Jeswine et al. ................. 180/164 |
| 2006/0117573 A1 * | 6/2006 | Jensen et al. ..................... 30/286 |
| 2007/0000361 A1 * | 1/2007 | Ericson ............................. 83/13 |
| 2007/0040415 A1 * | 2/2007 | Ericson .......................... 296/201 |
| 2007/0214649 A1 * | 9/2007 | Hess ................................ 30/116 |
| 2008/0012349 A1 * | 1/2008 | Finck .............................. 292/70 |

(Continued)

FOREIGN PATENT DOCUMENTS

| DE | 3215892 A1 | 11/1983 |
| DE | 4012207 C1 | 10/1991 |

(Continued)

*Primary Examiner* — Sean Michalski
(74) *Attorney, Agent, or Firm* — St. Onge Steward Johnston & Reens LLC

(57) ABSTRACT

A device and a method for cutting through the adhesive bead of panes that have been fixed by bonding is specified, said device having a motor-drivable winding device, a coil for winding-on a separating means for cutting through the adhesive bead, a suction plate for fixing the winding device by means of negative pressure on a pane to be removed, wherein the winding device is mounted so as to be rotatable on the suction plate and wherein at least one guide roller for guiding the separating means is provided, which is preferably placed in a corner region of the pane in order to hold the cutting angle between separating means and adhesive bead extensively ≤90° during the removal operation.

5 Claims, 4 Drawing Sheets

(56) References Cited

U.S. PATENT DOCUMENTS

| | | | |
|---|---|---|---|
| 2008/0255503 A1* | 10/2008 | Quackenbush et al. | 604/74 |
| 2009/0283214 A1* | 11/2009 | Nelson | 156/344 |
| 2010/0132201 A1* | 6/2010 | Klabunde et al. | 30/277.4 |
| 2010/0132882 A1* | 6/2010 | Hess et al. | 156/250 |
| 2011/0178727 A1* | 7/2011 | Hafenrichter et al. | 702/38 |
| 2012/0227896 A1* | 9/2012 | Clabunde | 156/193 |
| 2013/0283986 A1* | 10/2013 | Finck | 83/39 |
| 2013/0327193 A1* | 12/2013 | Davies et al. | 83/13 |

FOREIGN PATENT DOCUMENTS

| | | |
|---|---|---|
| DE | 102006013417 A1 | 9/2007 |
| DE | 102008060802 A1 | 6/2010 |
| DE | 102008060812 A1 | 6/2010 |
| WO | 8607017 A1 | 12/1986 |
| WO | 2009153027 A1 | 12/2009 |

\* cited by examiner

DEVICE AND METHOD FOR CUTTING THROUGH THE ADHESIVE BEAD OF PANES

RELATED APPLICATIONS

This application claims priority of German Patent Application 10 2011 013 890.0 which was filed on Mar. 7, 2011, the entire content of this priority application being incorporated herein by reference.

BACKGROUND OF THE INVENTION

The invention relates to a device for cutting through the adhesive bead of panes that have been fixed by bonding, the device having a motor-drivable winding device, a coil for winding-on a separating means for cutting through the adhesive bead, a suction plate for fixing the winding device by means of negative pressure on a pane to be removed, wherein the winding device is mounted so as to be rotatable on the suction plate.

The invention also relates to a method for cutting through the adhesive bead of panes that have been fixed by bonding, where a winding device, which has a motor-drivable coil for winding-on a separating means for cutting through the adhesive bead, is fastened by means of a suction plate on an inner side of a pane to be removed, wherein the winding device is mounted so as to be rotatable on the suction plate and wherein the adhesive bead is cut through by winding-on the separating means.

A device of this type and a method of this type are known from DE 10 2008 060 812 A1.

In the case of the known device and of the known method, the winding device is couplable by means of a detachable coupling to a suction plate, which is fixable on the inner side of a vehicle, in such a manner that the winding device is accommodated so as to be rotatable on the suction plate. During the driving of the winding device, the winding device is consequently automatically aligned on the cutting means.

A disadvantage here is that the angle between the separating means and the adhesive bead for a large part of the adhesive bead to be cut through is clearly greater than 90°, which leads to a large amount of tensile loading on the separating means and brings about either a non-clean cut or in the case of extreme tensile loading can even lead to the separating means tearing.

DE 40 12 207 C1 discloses a further device and a further method for cutting through the adhesive bead of panes that have been fixed by bonding. In this case, a winding device is fastened by means of two suction plates on the pane to be removed. In addition, a guide roller each is fastened by means of a suction plate in the region of the two bottom corners. The two ends of a cutting wire pierce the adhesive bead, one end is fixed and the other end is guided around the guide rollers and around the adhesive bead and is finally fastened on a first coil of the winding device. By driving the coil, the cutting wire is now gradually pulled through the adhesive bead such that the adhesive bead is cut through. When the adhesive bead of approximately half the circumference of the pane has been cut through, the wound-on end portion of the cutting wire is fixed and the other, previously fixed end portion is wound-on in order to detach the other half of the pane in the same way. Two separate winding drums, which are drivable in opposite directions of rotation and are selectively lockable, are provided for this purpose. In this case, each winding drum receives one of the two end portions of the cutting wire.

A disadvantage in the case of the known device and in the case of the known method is that different winding devices have to be provided for winding-on the cutting wire in the one and in the other direction.

SUMMARY OF THE INVENTION

In view of this, it is a first object of the invention to disclose a device for cutting through the adhesive bead of panes that have been fixed by bonding, by means of which, even where there is only a narrow gap between the pane and the flange on which the pane is fixed by bonding, it is possible to cut through the adhesive bead in a reliable manner.

It is a second object of the invention to disclose a device for cutting through the adhesive bead of panes that have been fixed by bonding allowing to keep the tensile loading on the separating means as low as possible.

It is a third object of the invention to disclose a device for cutting through the adhesive bead of panes that have been fixed by bonding which can be operated by a single person.

It is a forth object of the invention to disclose a device for cutting through the adhesive bead of panes that have been fixed by bonding allowing for an easy cutting operation to be performed by a single person.

According to one aspect these and other objects are achieved by a device for cutting through the adhesive bead of panes fixed by bonding, said device comprising:

a winding device;

a motor drive driving said winding device;

a suction plate fixed on said winding device for securing for securing said winding device by means of negative pressure on a pane to be removed;

a vacuum pump which is coupled to said suction plate for generating negative pressure between said suction plate and said pane;

a coil rotatable by said winding device for winding-on a separating means for cutting through said adhesive bead;

a controller for controlling said motor drive;

a sensor coupled to said controller for holding said negative pressure below a predetermined threshold value; and at least one guide roller adapted to be fixed on said pane remote from said winding device for guiding said separating means when reeling in said separating means on said coil while cutting through said adhesive bead.

According to another aspect these and other objects are achieved by a method for cutting through the adhesive bead of panes that have been fixed by bonding, the method comprising the following steps:

fastening a winding device, which has a motor-drivable coil for winding-on a separating means for cutting through the adhesive bead, by means of a suction plate on an inner side of a pane to be removed, wherein said winding device is mounted so as to be rotatable on the suction plate;

fastening a guide roller on the inner side of the pane to be removed.

fastening a first end of the separating means on a fixed point in the region of the pane to be removed or on the winding device;

guiding the separating means around the adhesive bead from the outside and pierce the adhesive bead in order to guide a second end of the separating means towards the inner side of the pane;

guiding the second end of the separating means around the guide roller and fasten it to the coil;

cutting through the adhesive bead by winding the separating means on the coil while between said separating means and a current location of said separating means within said adhesive bead defines a cutting angle;

wherein the separating operation is interrupted and the guide roller is re-positioned for holding said cutting angle as low as possible during the cutting operation.

It is obvious that the steps provided in the case of the method according to the invention do not necessarily have to be carried out in this sequence but can also be performed in another sequence.

Within the context of this application, the term "separating means" refers to any wire or even any cord which, in principle, is suitable for cutting through the adhesive bead of a pane. This means that the separating means has to have sufficient tear strength and flexibility and, where applicable, is provided with a suitable coating or suitable surface features in the form of tooth attachments or the like in order to support the cutting operation, However, it is obvious that the term "separating means" can also refer to a suitable cord made of plastics material or the like.

By one guide roller, which is preferably placed in a corner region of the pane, being used according to the invention, it is possible to hold the cutting angle between the separating means and the adhesive bead predominantly ≤90° during the removal operation. To this end, when the cutting angle gradually becomes larger and approaches a region of 90°, the separating operation is preferably interrupted and the guide roller is repositioned, preferably in a corner region, such that the cutting angle once again becomes clearly less than 90°.

By re-arranging the guide roller several times, it can be ensured in this manner that the cutting angle is predominantly ≤90° during the removal operation. Less tensile loading on the cutting means is ensured in this manner and a cleaner cut is achieved.

In an advantageous further development of the invention, a vacuum pump which is coupled to the suction plate is provided.

Reliable fastening of the device to the pane is ensured in this manner.

In this case, the vacuum pump preferably has a sensor in order to hold the negative pressure below a predetermined threshold value.

Automatic maintaining of a certain minimum vacuum is ensured in this manner such that reliable fastening of the winding device is ensured irrespective of the tensile loading acting on the separating means.

According to a preferred development of the invention, the guide roller is fixable by means of a suction plate on the pane to be removed.

This enables simple fastening of the guide roller on the pane to be removed as well as simple re-arrangement.

The winding device preferably includes a drive with a gear unit which is coupled to the coil for driving the coil.

In this manner it is possible to reduce the removal speed in a suitable manner such that the removal operation can be effected at an adapted speed.

The drive of the winding device is preferably stopped when the sensor detects that a minimum negative pressure has been exceeded.

Reliable operation is ensured in this manner if the negative pressure were once to fail.

The winding-on speed is preferably adjustable in a stepless manner, for which purpose, for example, an acceleration switch can be provided.

According to a further development of the invention, a remote control means is provided for controlling the drive.

In this way it is possible to work in a simple and energy-saving manner during the removal operation. To this end, the operator is able to sit on one of the front seats, for instance, and control the removal operation in a comfortable manner by using the remote control means.

To save weight, the winding device preferably does not have a battery for supplying the drive motor with power, but rather is supplied externally.

It is obvious that the aforementioned features of the invention and the features of the invention yet to be mentioned below are usable not only in the combination specified in each case, but also in other combinations of the invention or standing alone without departing from the framework of the invention.

BRIEF DESCRIPTION OF THE DRAWINGS

Further features and advantages of the invention can be seen from the following description of preferred exemplary embodiments with reference to the drawing, in which.

DETAILED DESCRIPTION OF THE PREFERRED EMBODIMENTS

The basic principle of the invention is explained initially by way of FIGS. 1a) to h).

The present case concerns an automobile windscreen which has been bonded on the body flange from the outside by means of a polyurethane-based adhesive. By only a very small gap remaining between the edge of the pane and the body flange, considerable demands are made on removal by means of a separating means, for instance in the form of a cutting wire, in order to avoid damaging the body flange during the removal operation.

Figure 1:
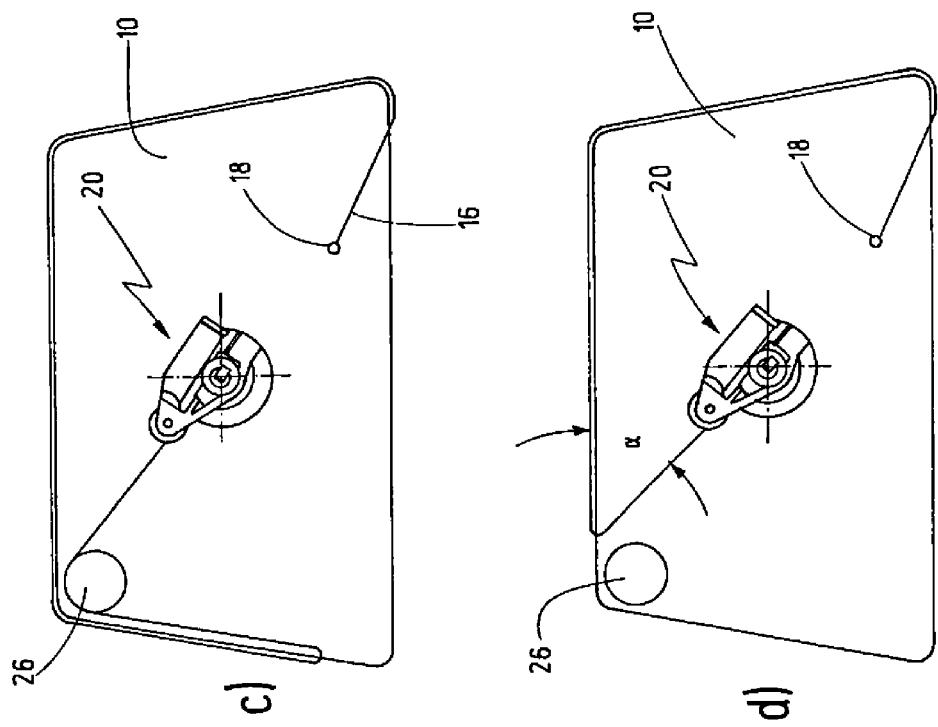
FIGS. 1a) to h) show various stages of a removal operation for removing a windscreen according to the method according to the invention.
Figure 1:
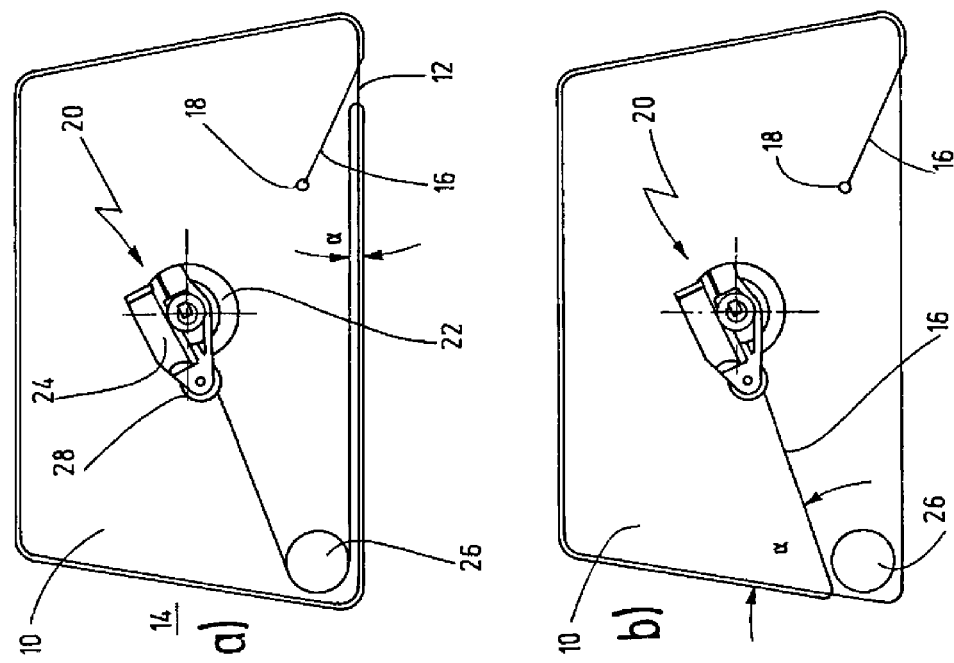
Figure 1:
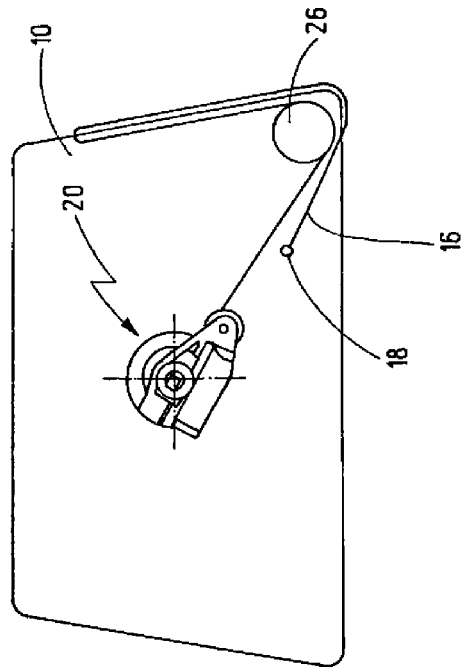
Figure 1:
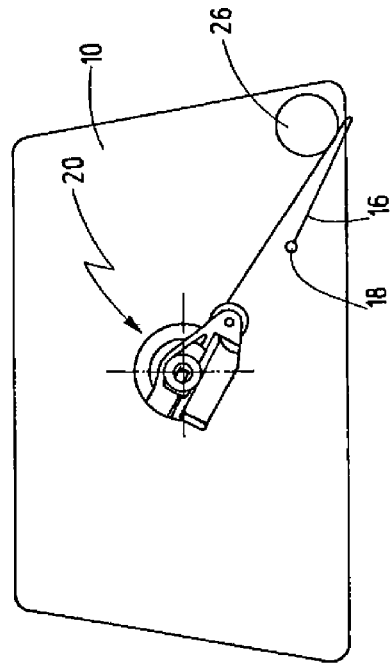
Figure 1:
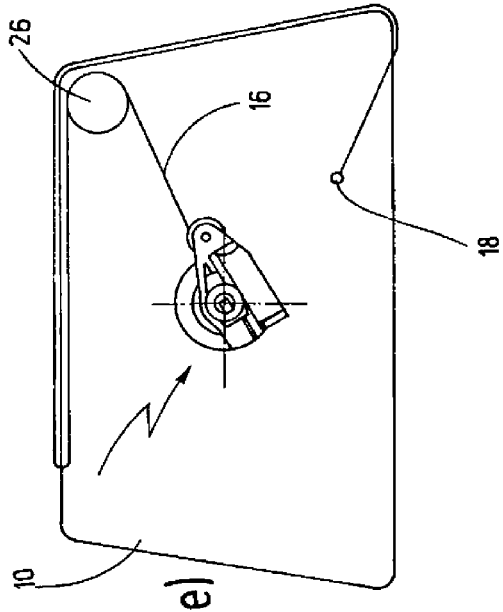
Figure 1:
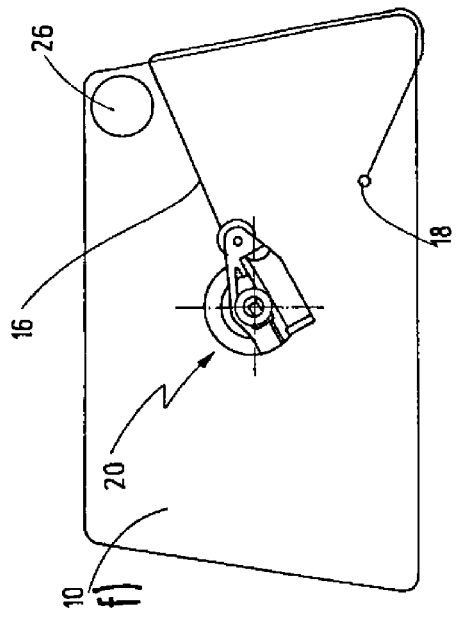

FIG. 1 shows a view from the inside of a windscreen 10 which has been fixed by bonding and which has been fixed by bonding on the body flange 14 of a vehicle from the outside by means of a circumferential adhesive bead 12.

According to the invention, the cutting through of the adhesive bead 12 is effected by means of a separating means 16 in the form of a wire, the arrangement being made such that the cutting angle α between the adhesive bead 12 and the separating means 16 remains predominantly less than 90° during the removal operation.

A device 20, which includes a winding device 24 for winding the separating means 16 on a coil 28, is used for this purpose. The winding device 24 is fixable by means of a suction plate 22 on the inner side of the pane 10 to be removed, the winding device 24 being freely rotatable in relation to the suction plate 22. On account of the rotatable fixing of the winding device 24 on the suction plate 22, the winding device 24 is aligned directly on the separating means 16 during the removal operation.

In order now to ensure working at a cutting angle α of ≤90° extensively during the removal operation, a guide roller 26, via which the separating means 16 is guided, is positioned in each case in the corner region of the pane 10 ahead of the cutting means.

The various stages of the removal operation produced in this case are explained below by way of FIGS. 1a) to h).

First of all, the winding device 24 is fixed by means of the suction plate 22 on the inner side of the pane 10 to be removed, preferably approximately in the centre thereof. The guide roller 26, which is equally held on a suction plate, is also positioned by means of the suction plate in a first corner region, for example in the left-hand bottom corner region when viewed from the inside according to FIG. 1a). A first end of the cutting means 16 is fixed on the vehicle body, on the winding device 24 or, for instance, by way of a separate suction plate on the pane 10. For example, the cutting means 16 can be fixed on a fixed point 18 on the windscreen wiper shaft. A clamping device could also be provided on the winding device, the end of the cutting means 16 being fixed on the clamping device. As an alternative to this, for example, a separate suction plate could be provided in order to fasten the cutting means 16 thereto. In so far as the end of the cutting means 16 is to be fixed on the inner side of the pane 10, the cutting means 16 first of all pierces the adhesive bead 12 from the outside by way of a hollow needle or the like and is then fastened on the inner side of the pane 10. The piercing of the adhesive bead 12 is practically possible only in the region of the bottom edge of the pane 10 to be removed. The separating means 16 is then guided cleanly about the adhesive bead 12 along the gap between the edge of the pane 10 and the circumferential body flange until the end of the separating means is able to pierce the adhesive bead 12 in the direct vicinity of the first end of the separating means once again by way of a hollow needle or the like. The separating means 16 is then guided around the guide roller 26 and fastened on the coil 28 of the winding device 24.

The removal operation can now be effected in a controlled manner by winding the separating means 16 on the coil 28. According to FIG. 1a), at the start a cutting angle α is produced of approximately 0° or a little above. The removal operation can be controlled by the operator comfortably from the inside of the vehicle by way of a remote control means, for which purpose an accelerator switch on the remote control means is actuated.

In this connection, the winding speed of the separating means 16 on the coil 28 can be controlled in a suitable manner in order to achieve an optimum removal operation. In this connection, the adhesive bead 12 is initially cut through in a gradual manner from the start position shown in FIG. 1a) by the separating means 16 being pulled to the left until around the coil 26 and then according to FIG. 1b) creeping in the direction of the left-hand top corner.

Before the cutting angle α becomes too large, the removal operation is interrupted and the guide roller 26 is displaced into the left-hand top corner according to FIG. 1c). To this end, the separating means 16 has to be unwound again in part from the coil 28, which is made possible by controlling the drive in a suitable manner in order to allow the separating means 16 to unwind again. In this case, the snug separating means 16, still held at the adhesive bead according to FIG. 1b), is unwound again by moving the guide roller 26 upward into the left-hand top corner region until the position of the guide roller 26 according to FIG. 1c) is produced.

The guide roller 26 is fixed in this position by means of the suction plate. The removal operation is then able to be continued until the separating means has moved around the guide roller 26, as shown in FIG. 1d). Before the cutting angle α becomes too large, the removal operation is interrupted once again and the guide roller 26 is displaced in the afore-described manner such that the position in the right-hand top corner according to FIG. 1e) is produced.

The removal operation can now be continued once again until the separating means 16 has moved around the guide roller 26 and a condition according to FIG. 1f) is produced. Before the cutting angle α becomes too large once again, the removal operation is interrupted and the guide roller 26 is displaced into the right-hand bottom corner of the pane 10 in the afore-described manner, the separating means once again being pulled out of the winding device until the position shown in FIG. 1g) is produced.

The removal operation is now continued until the adhesive bead has been cut through so far that the position according to FIG. 1h) is produced. During the further winding of the separating means on the winding device, the separating means is finally pulled in onto the inner side of the pane 10 such that the adhesive bead is completely cut through and the removal operation is terminated.

The design of the device 20 is explained in more detail below briefly by way of FIGS. 2 to 4.

As already mentioned, the device 20 comprises a winding device 24, by means of which a coil 28 is able to be wound-on in a motor-driven manner for winding-on the separating means 16. The suction plate 22 is provided for fixing the winding device 24 on the inner side of the pane 10, the suction plate being supplied with negative pressure by means of a vacuum pump 44 (FIG. 4).

In order to ensure reliable fixing of the device 20 on the pane 10, the vacuum pump 44 includes a sensor for monitoring the negative pressure, such that the vacuum pump 44 is automatically switched on if the pressure increases beyond a certain threshold value. The winding device 24, including drive 34 and coil 28, is accommodated on a coil arm 30 which is fixed so as to be freely rotatable on a receiving means on the suction plate 22, the receiving means being given the overall reference 32. To this end, according to FIG. 4, the suction plate 22 has a hollow axis of rotation 46, on which the coil arm 30 is fixed so as to be rotatable by means of a bearing 48 in the form of a sliding bearing.

The drive 34, in the form of a universal motor with a coupled-on gear unit 36, e.g. in the form of planetary gearing which drives the coil 28 by means of bevel gearing, is accommodated on the side of the coil arm 30. At the end of the drive 34, a connection 38 for a remote control means protrudes from the coil arm 30, by means of which connection an external power supply for the drive 34 is ensured and by means of which the drive is able to be controlled in a suitable manner by means of an accelerator switch using a suitable remote control means.

Figure 2:
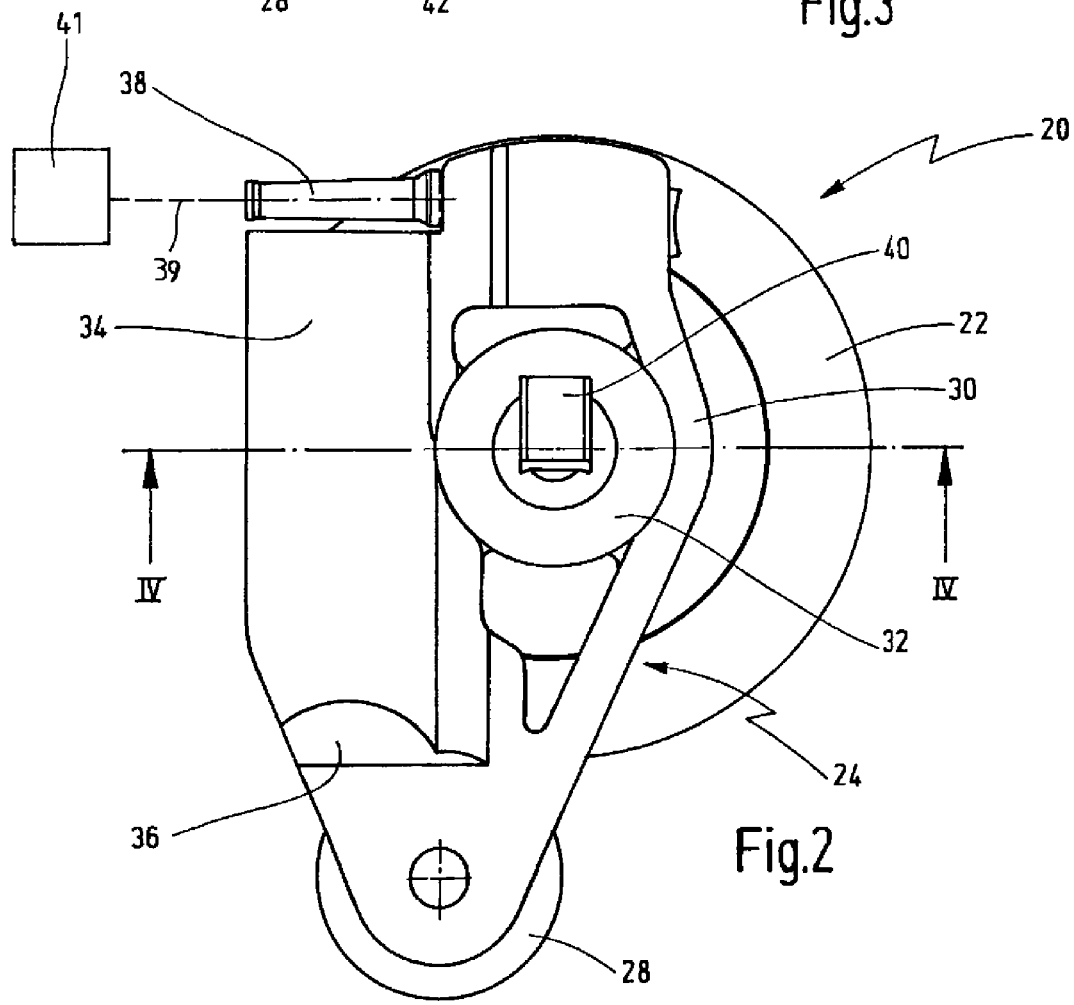
FIG. 2 shows a top view of a device according to the invention.

In FIG. 2 only the remote control is depicted by 41 which connected to the connection 38 by a suitable electrical cord connection depicted by 39. The remote control 41 is configured for fully controlling the speed of the drive 34. The remote control 41 may control the winding speed depending on depressing of an accelerator switch provided on the remote control 34 (not shown). Another connection 40 for the vacuum pump 44 can be seen at the top end of the receiving means 32 according to FIG. 2, the vacuum pump being supplied with current by means of the connection.

Figure 3:
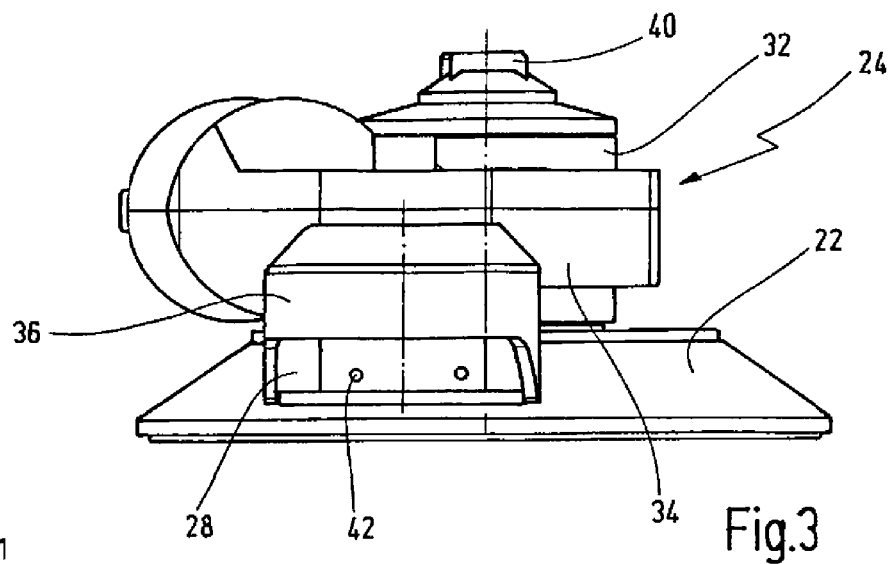
FIG. 3 shows a view of the device according to FIG. 2 from the side of the coil and FIG. 4 shows a section through the device according to FIG. 2 according to the line IV-IV.
Figure 4:
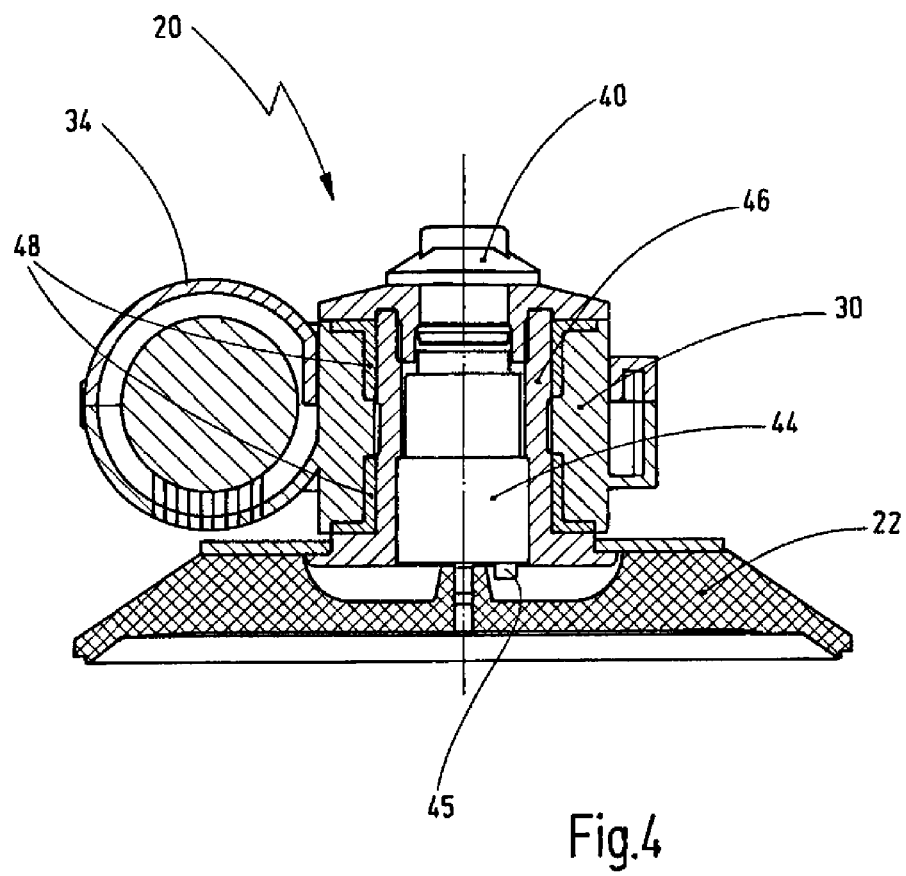

In addition, more receiving means 42 configured as bores can be seen in FIG. 3, wherein the separating means 16 can be inserted into one of the bores and then, when the coil 28 is actuated, is fixed on the coil and consequently is able to be wound-on.

What is claimed is:

1. A device for cutting through the adhesive bead of panes fixed by bonding, said device comprising:
a winding device;
a motor drive driving said winding device;

a suction plate fixed on said winding device for securing for securing said winding device by means of negative pressure on a pane to be removed;

a vacuum pump which is coupled to said suction plate for generating negative pressure between said suction plate and said pane;

a coil rotatable by said winding device for winding-on a separating means for cutting through said adhesive bead;

a controller for controlling said motor drive;

a sensor coupled to said controller for holding said negative pressure below a predetermined threshold value; and at least one guide roller adapted to be fixed on said pane remote from said winding device for guiding said separating means when reeling in said separating means on said coil while cutting through said adhesive bead.

2. The device of claim 1, wherein said guide roller is fixed to a suction plate for securing said guide roller on said pane to be removed.

3. The device of claim 1, wherein said motor drive is coupled to a gear which engages said coil for driving said coil.

4. The device according to claim 1, wherein said controller is configured for adjusting a speed of rotation of said drive continuously.

5. The device according to claim 1, further comprising a remote control for controlling said drive.

* * * * *